(12) United States Patent
Husted et al.

(10) Patent No.: US 9,457,718 B2
(45) Date of Patent: Oct. 4, 2016

(54) OBSTACLE DETECTION SYSTEM

(71) Applicant: Caterpillar Inc., Peoria, IL (US)

(72) Inventors: Douglas Husted, Secor, IL (US); Peter Petrany, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 28 days.

(21) Appl. No.: 14/577,171

(22) Filed: Dec. 19, 2014

(65) Prior Publication Data

US 2016/0176338 A1    Jun. 23, 2016

(51) Int. Cl.
B60Q 1/00 (2006.01)
B60Q 9/00 (2006.01)
B60R 1/00 (2006.01)

(52) U.S. Cl.
CPC ............... B60Q 9/008 (2013.01); B60R 1/00 (2013.01); B60R 2300/00 (2013.01)

(58) Field of Classification Search
CPC .......... G08G 1/00; G08B 23/00; B60Q 1/00; G06G 7/78
USPC ........ 340/435, 904, 436, 438, 576; 701/300, 701/301
See application file for complete search history.

(56) References Cited

U.S. PATENT DOCUMENTS

| | | | |
|---|---|---|---|
| 5,587,929 A | 12/1996 | League et al. | |
| 7,072,764 B2 | 7/2006 | Donath et al. | |
| 7,522,066 B2 | 4/2009 | Galera et al. | |
| 8,170,787 B2* | 5/2012 | Coats | 340/435 |
| 8,224,516 B2 | 7/2012 | Anderson | |
| 8,280,621 B2* | 10/2012 | Edwards | 340/435 |
| 8,351,684 B2 | 1/2013 | Clar et al. | |
| 8,423,280 B2* | 4/2013 | Edwards | 340/435 |
| 8,599,027 B2* | 12/2013 | Sanchez | A61B 3/113 340/435 |
| 8,744,646 B2 | 6/2014 | Buschmann et al. | |
| 2011/0254700 A1* | 10/2011 | Gharsalli | G08G 1/166 340/904 |
| 2013/0346127 A1 | 12/2013 | Jensen | |

FOREIGN PATENT DOCUMENTS

WO    WO 2014/045464 A1    3/2014

* cited by examiner

*Primary Examiner* — Toan N Pham
(74) *Attorney, Agent, or Firm* — Leydig, Voit & Mayer, Ltd.

(57) ABSTRACT

An obstacle detection system includes an object detection system, an alert system, and a controller. The controller is configured to store an electronic map containing a known obstacle, store known and unknown obstacle warning zones, and detect a detected object in proximity to the machine. The controller is further configured to compare the detected object to the known obstacle to determine whether the detected object is a known obstacle or an unknown obstacle, generate a first alert signal if the detected object is a known obstacle and within the known obstacle warning zone, and generate a second alert signal if the detected object is an unknown obstacle and within the unknown obstacle warning zone.

20 Claims, 7 Drawing Sheets

OBSTACLE DETECTION SYSTEM

TECHNICAL FIELD

This disclosure relates generally to an obstacle detection system, and more particularly, to an obstacle detection system that differentiates between known and unknown obstacles.

BACKGROUND

Movable machines such as haul trucks, dozers, motor graders, excavators, wheel loaders, and other types of equipment are used to perform a variety of tasks. For example, these machines may be used to move material and/or alter work surfaces at a work site. The machines may perform operations such as digging, loosening, carrying, etc., different materials at the work site.

Due to the size and configuration of these machines, an operator may have a limited field of view with respect to the environment in which a machine is operating. Accordingly, some machines may be equipped with an object detection system that includes sensors for detecting objects in proximity to the machine. The object detection system may warn an operator if the machine is within a predetermined range of an obstacle so that the operator may take corrective or necessary actions to avoid a collision with the obstacle.

During operation at a work site, a machine may be moved in a somewhat repetitive manner such as repeatedly performing similar tasks at a relatively localized area (e.g., loading one or more haul trucks, moving material along a work surface towards a target location). As the operator performs the desired tasks, the operator is typically aware of one or more known objects or obstacles that are adjacent to or in the path of the machine at the work site. However, the object detection system may still provide or generate warnings about such known obstacles. As a result, an operator may sometimes ignore some of the warnings. If, however, an unknown object or obstacle has moved into the area adjacent the machine, the operator may be ignoring warnings with respect to the unknown obstacle based upon a belief that the warnings are being generated due to a known obstacle.

U.S. Pat. No. 7,522,066 discloses a system for evaluating proximity to potential hazards. The system may include a plurality of sensors that are used to determine the distance from potential hazards. If the system determines that a person is located closer to a hazard than desired, the system may stop the operation of a machine. A zone around each hazard may set a minimum distance from the hazard.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, an obstacle detection system for use at a work site includes an object detection system associated with a machine for detecting objects in proximity to the machine, an alert system for generating an alert signal, and a controller. The controller is configured to store an electronic map containing a known obstacle, store a known obstacle warning zone and an unknown obstacle warning zone, and detect a detected object in proximity to the machine. The controller is further configured to compare the detected object to the known obstacle to determine whether the detected object is a known obstacle or an unknown obstacle, generate a first alert signal if the detected object is a known obstacle and within the known obstacle warning zone, and generate a second alert signal if the detected object is an unknown obstacle and within the unknown obstacle warning zone.

In another aspect, a controller-implemented method of detecting obstacles at a work site includes storing electronic map containing a known obstacle, storing a known obstacle warning zone and an unknown obstacle warning zone, and detecting a detected object in proximity to a machine. The method further includes comparing the detected object to the known obstacle to determine whether the detected object is a known obstacle or an unknown obstacle, generating a first alert signal if the detected object is a known obstacle and within the known obstacle warning zone, and generating a second alert signal if the detected object is an unknown obstacle and within the unknown obstacle warning zone.

In still another aspect, a machine includes a propulsion system, an object detection system associated with the machine for detecting objects in proximity to the machine, an alert system for generating an alert signal, and a controller. The controller is configured to store an electronic map containing a known obstacle, store a known obstacle warning zone and an unknown obstacle warning zone, and detect a detected object in proximity to the machine. The controller is further configured to compare the detected object to the known obstacle to determine whether the detected object is a known obstacle or an unknown obstacle, generate a first alert signal if the detected object is a known obstacle and within the known obstacle warning zone, and generate a second alert signal if the detected object is an unknown obstacle and within the unknown obstacle warning zone.

DETAILED DESCRIPTION

Figure 1:
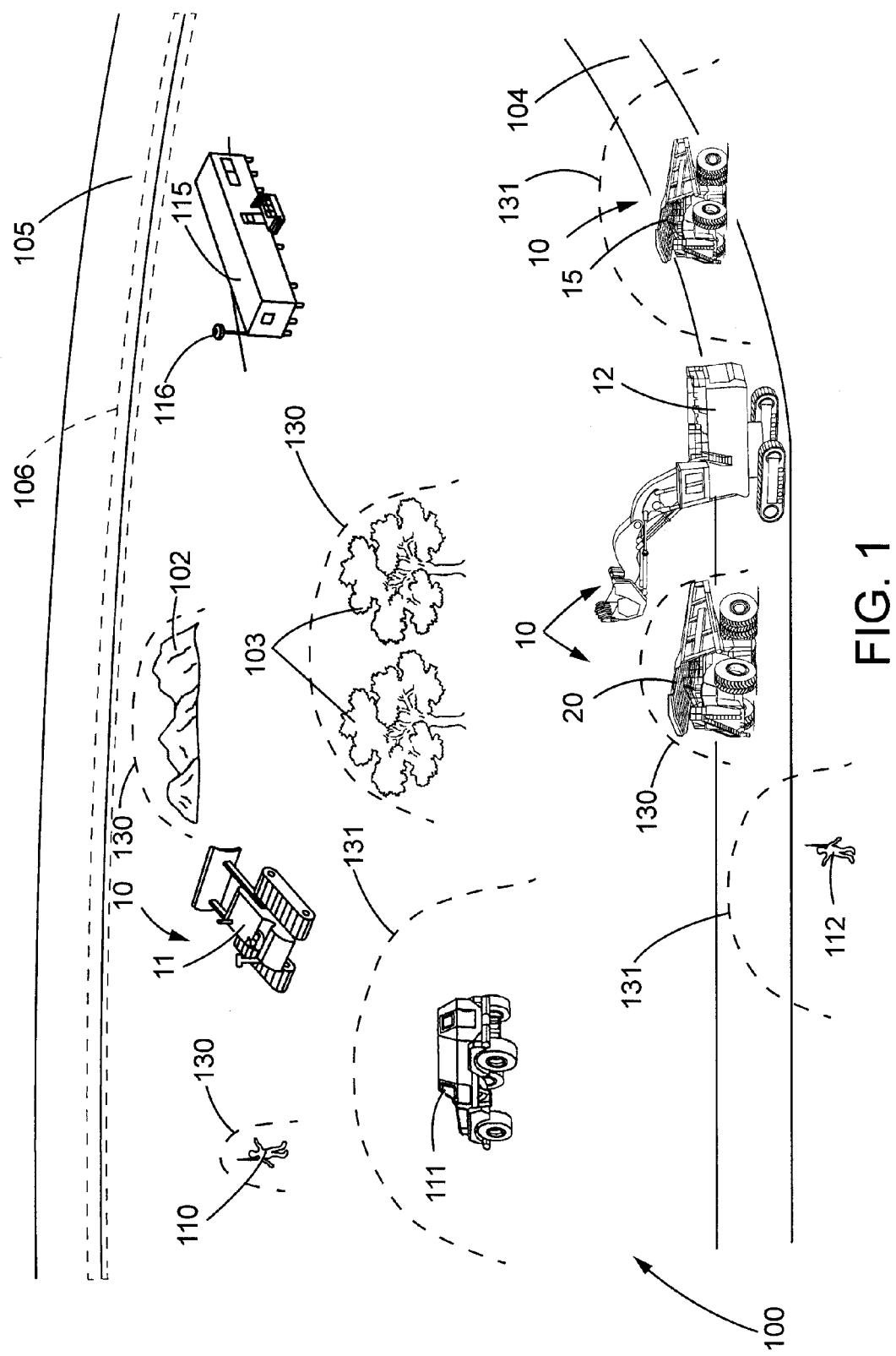
FIG. 1 is a schematic view of a work site at which a machine incorporating the principles disclosed herein may be used.

FIG. 1 illustrates an exemplary work site 100 with machines 10 operating at the work site. Work site 100 may include, for example, a mine site, a landfill, a quarry, a construction site, a road work site, or any other type of work site. Machines 10 may perform any of a plurality of desired operations or tasks at work site 100, and such operations or tasks may require the machine to generally traverse work site 100. Any number of machines 10 may simultaneously and cooperatively operate at work site 100, as desired. Machines 10 may embody any type of machine. As depicted in FIG. 1, machines 10 include a dozer 11, an excavator such as a hydraulic shovel 12, and a haul truck 20.

While operating at work site 100, machines 10 may encounter one or more obstacles. The obstacles may embody any type of object including those that are fixed or stationary as well as those that are movable or that are moving. Examples of fixed obstacles may include infrastructure, storage, and processing facilities, buildings, trees, and other structures and fixtures found at a work site. Examples of movable obstacles may include machines, light duty vehicles (such as pick-up trucks and cars), personnel, and other items that may move about work site 100.

As depicted in FIG. 1, dozer 11 may be operating to move material along the surface of the work site 100 to create piles or mounds of material 102. Fixed obstacles may include the mounds of material 102 and trees 103 in proximity to the dozer 11. Movable obstacles may include a person 110 standing near the dozer 11 observing the operation and a light duty truck 111. Hydraulic shovel 12 may be operating to load haul truck 20. A second haul truck 15 may be waiting on haul road 104. Movable obstacles near the hydraulic shovel 12 and haul truck 20 may include second haul truck 15 and second person 112.

Figure 2:
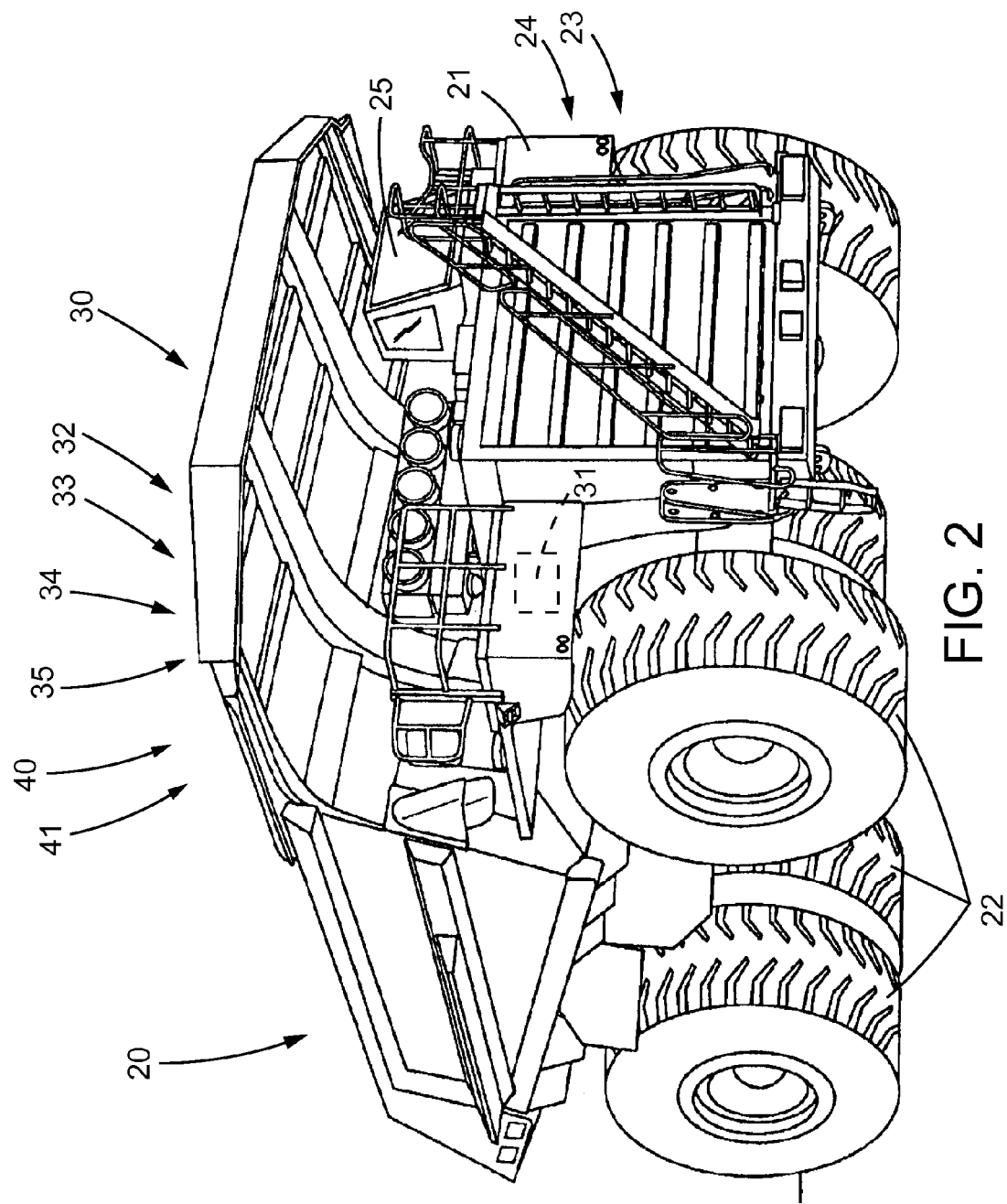
FIG. 2 is a diagrammatic view of a machine in accordance with the disclosure.

Referring to FIG. 2 as an example of a machine 10, haul truck 20 may include, among other things, a body 21 supported by one or more traction devices 22 and a propulsion system for propelling the traction devices. The propulsion system may include a prime mover 23, as shown generally by an arrow in FIG. 2 indicating association with the machine 10, and a transmission 24, as shown generally by an arrow in FIG. 2 indicating association with the machine, operatively connected to the prime mover. Machine 10 may include a cab or operator station 25 that an operator may physically occupy and provide input to operate the machine.

Figure 3:
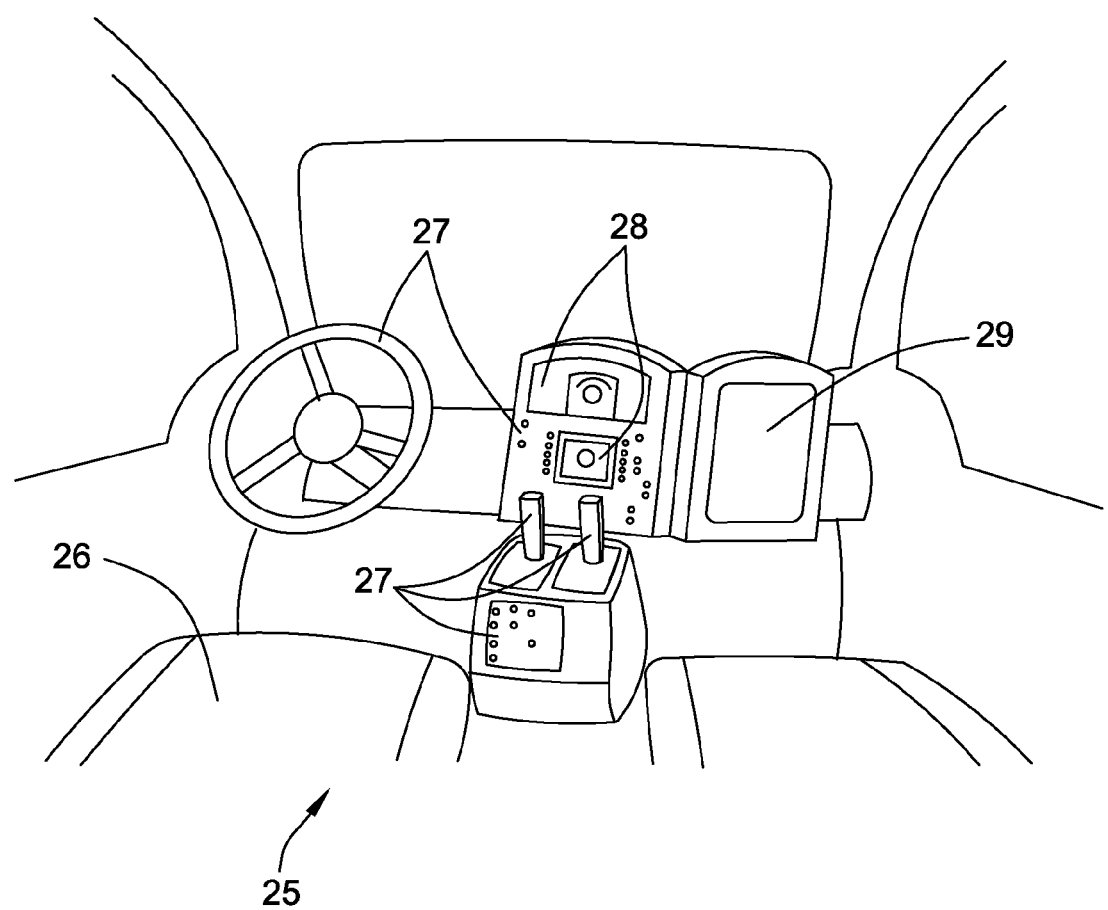
FIG. 3 is a diagrammatic view of an operator station of the machine of FIG. 2.

Referring to FIG. 3, operator station 25 may include an operator seat 26, one or more input devices 27 such as a steering wheel, levers, knobs, buttons, joysticks, etc. through which the operator may issue commands to control the operation of the machine 10 such as the propulsion and steering as well as operate various implements associated with the machine. One or more instrument arrays 28 may be positioned within the operator station 25 to provide information to the operator and may further include additional input devices such as knobs and buttons. Operator station 25 may further include a visual image display device such as a display screen 29.

Machine 10 may include a control system 30, as shown generally by an arrow in FIG. 2 indicating association with the machine. The control system 30 may utilize one or more sensors to provide data and input signals representative of various operating parameters of the machine 10 and the environment of the work site 100 at which the machine is operating. The control system 30 may include an electronic control module or controller 31 and a plurality of sensors associated with the machine 10.

The controller 31 may be an electronic controller that operates in a logical fashion to perform operations, execute control algorithms, store and retrieve data and other desired operations. The controller 31 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 31 such as power supply circuitry, signal conditioning circuitry, driver circuitry, and other types of circuitry.

The controller 31 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 31 may be implemented in hardware and/or software without regard to the functionality. The controller 31 may rely on one or more data maps relating to the operating conditions and the operating environment of the machine 10 and the work site 100 that may be stored in the memory of controller. Each of these data maps may include a collection of data in the form of tables, graphs, and/or equations.

The control system 30 and controller 31 may be located on the machine 10 or may be distributed with components also located remotely from the machine such as at a command center 115 (FIG. 1). The functionality of control system 30 may be distributed so that certain functions are performed at machine 10 and other functions are performed remotely. In such case, the control system 30 may include a communications system such as wireless network system 116 for transmitting signals between the machine 10 and a system located remote from the machine such as at the command center.

Machine 10 may be equipped with a plurality of machine sensors 32, as shown generally by an arrow in FIG. 2 indicating association with the machine, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 33, as shown generally by an arrow in FIG. 2 indicating association with the machine 10, may include a position sensor 34, also shown generally by an arrow in FIG. 2 to indicate association with the machine, to sense the position of the machine relative to the work site 100. The position sensor 34 may include a plurality of individual sensors that cooperate to generate and provide position signals to controller 31 indicative of the position of the machine 10. In one example, the position sensor 34 may include one or more sensors that interact with a positioning system such as a global navigation satellite system or a global positioning system to operate as a position sensor. The controller 31 may use position signals from the position sensor 34 to determine the position of the machine 10 within work site 100. In other examples, the position sensor 34 may include an odometer or another wheel rotation sensing sensor, a perception based system, or may use other systems such as lasers, sonar, or radar to determine all or some aspects of the position of machine 10.

Figure 4:
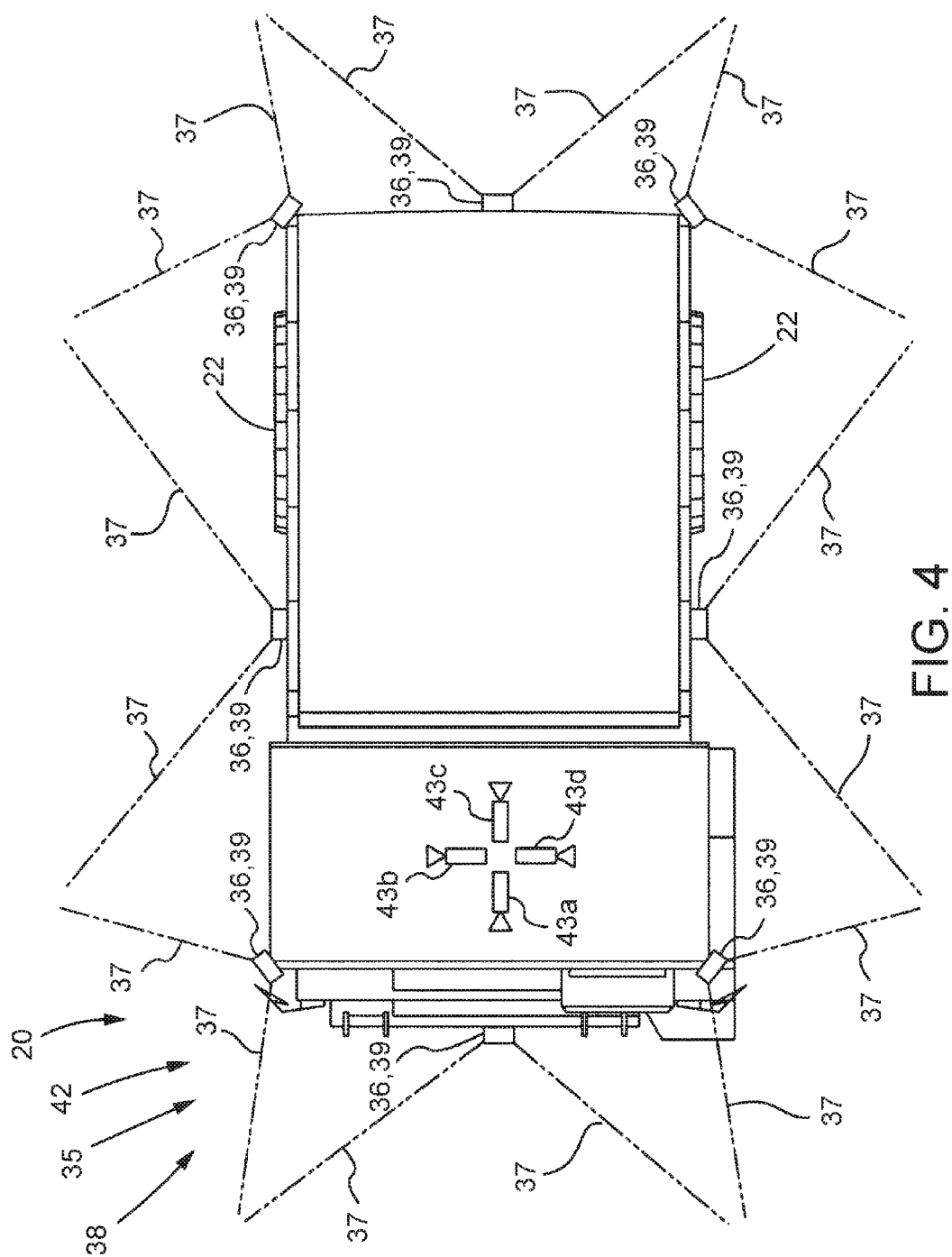
FIG. 4 is a schematic top plan view of the machine of FIG. 2.

To reduce the likelihood of a collision between machine 10 and an obstacle, an object detection system 35 may be mounted on or associated with the machine, as shown generally by an arrow in FIG. 4 indicating association with the machine. The object detection system 35 may include a radar system, a SONAR system, a LIDAR system, a camera vision system, and/or any other desired system together with associated object detection sensors 36. Object detection sensors 36 may generate data that is received by the controller 31 and used by the controller to determine the presence and position of obstacles within the range of the sensors. The field of view of each object detection sensor 36 is depicted schematically in FIG. 3 by reference number 37.

In another embodiment, communication of machine positions between two machines, directly or indirectly, may operate as an object detection system 35. For example, if the detected object is a machine or another device having a position sensing system, the controller 31 may determine the distance between the machine 10 and the detected object based upon the position of machine 10 as determined by its on-board position sensing system 33 and the position of the detected object as determined by its on-board position sensing system. More specifically, the object detection system 35 may use the difference in locations of the two machines to determine their separation. In one instance, the calculation of the difference may be result of direct communication between the two machines with the difference calculation performed by a component of controller 31 at the machine 10. In other instance, the calculation may be performed indirectly by communicating or reporting the positions of the machines to a component of controller remote from the machines, calculating the separation, and reporting the separation to the component of controller 31 at machine 10.

An object identification system 38 may be mounted on or associated with the machine 10 in addition to the object detection system 35, as shown generally by an arrow in FIG. 4 indicating association with the machine. In some instances, the object detection system 35 and the object identification system 38 may be integrated together. Object identification sensors 39 may generate data that is received by the controller 31 and used by the controller to determine the type of obstacles detected by the object detection system 35. The object identification sensors 39 may be part of or replace the object detection sensors 36 and thus are depicted schematically as the same components in FIG. 4. In an alternate embodiment, the object identification sensors may be separate components from the object detection sensors 36.

Controller 31 may include or access an electronic map of the work site 100 including the position of machine 10 and the positions of various known and unknown obstacles at the work site. Identifying the location of or mapping known obstacles within the electronic map may be accomplished in any desired manner. In one example, the machine 10 may be moved into a particular area of the work site 100 and the object detection system 35 may identify the location of various objects at the work site. The object detection system 35 may be configured so that any objects detected during the setup or calibration phase are designated and saved within the electronic map as known obstacles.

In another embodiment, all of the detected objects may be designated and saved within the electronic map as known obstacles unless a machine operator or other personnel excludes them from such a designation. In still another embodiment, a machine operator or other personnel may be required to designate any detected object as a known obstacle or such object will be treated as an unknown obstacle. In a further embodiment, the electronic map may be established based upon data from machines currently operating or previously operating at the work site 100. Through such a process, fixed obstacles such as infrastructure, storage, and buildings as described above may be identified within the electronic map as fixed known objects since their positions will generally not change over time. Under some circumstances, it may be desirable to require manual identification of any movable obstacles such as machines, light duty vehicles, and even personnel that are to be designated as known obstacles or movable known objects.

As the machine operates at the work site 100, various objects may be detected by the object detection system 35. The object identification system 38 may analyze the detected objects to determine whether they are known obstacles or unknown obstacles. To do so, the object identification system 38 may compare the location of the identified object to the locations of objects within the electronic map.

In some situations, systems associated with the object detection system 35 may operate differently depending on whether the detected objects are known obstacles or unknown obstacles. For example, the controller 31 may also include an alert system 40, as shown generally by an arrow in FIG. 2, for generating an alert signal to alert an operator that the machine 10 is within a predetermined distance from an obstacle. The controller 31 may be configured to generate an alert signal if the machine 10 is within a first distance from a known obstacle or within a second distance from an unknown known obstacle. More specifically, each known obstacle may be surrounded by a known obstacle warning zone having a first size and each unknown obstacle may be surrounded by an unknown obstacle warning zone having a second size. In one example, the known obstacle warning zone may extend 5 m beyond the outer edge of the known obstacles and the unknown obstacle warning zone may extend 25 m beyond the outer edge of the unknown obstacles.

Referring back to FIG. 1, the mounds of material 102, the trees 103, and the person 110 may be designated as known obstacles within the electronic map and have a known obstacle warning zone generally depicted at 130. The light duty truck 111 may be designated as an unknown obstacle within the electronic map and have an unknown obstacle warning zone generally depicted at 131. It may be seen that the unknown obstacle warning zone 131 is substantially larger than the known obstacle warning zone 130 in FIG. 1.

Similarly, haul truck 20 may be designated as a known obstacle within the electronic map and have a known obstacle warning zone 130. The second haul truck 15 and the second person 112 may be designated as unknown obstacles within the electronic map and have an unknown obstacle warning zone 131.

Modifications to the electronic map or the manner in which detected objects are processed may be made to reduce the number of warnings or alert signals. In one example, an operator may designate an unknown object as a known object. For example, when the object detection system 35 detects a newly detected object, the controller 31 may be configured to query the operator as to whether the object should be a known obstacle or an unknown obstacle. The operator may designate the newly detected object as a known obstacle by manipulating an input device to generate a conversion command and the newly detected object may be stored within the electronic map as a known obstacle. In some instances, in the absence of a designation as a known obstacle, the newly detected object may be designated as an unknown obstacle.

Once designated as a known object, a movable object may be tracked by the object detection system 35 and the object identification system 38 as it moves about the work site 100 and the controller 31 will maintain the obstacle's designation as a known obstacle. As a result, the operator will not need to re-designate the obstacle as a known obstacle and will only receive warnings and alert signals based upon the movable object's status or designation as a known obstacle.

In another example, certain geographic areas or paths at or adjacent the work site 100, but outside of the area in which the machine 10 is operating, may be classified as outside the electronic map or work site 100 even though those areas or paths are physically adjacent the area in which the machine 10 may be operating. For example, work site 100 may be positioned along a road or highway 105 separated from the work site by a fence or barrier 106. As depicted in FIG. 1, a machine 10 such as dozer 11 may be operating close enough to the highway 105 that vehicles (not shown) traveling along the highway may be detected by the obstacle detection system 35. Since each of the vehicles would likely be categorized by the object identification system 38 as unknown obstacles, the alert system 40 may be generating alert signals each time a vehicle passes by machine 10. To prevent a high number of warnings or alert signals from an area that will not be accessed by machine 10, the object detection system 35 or the object identification system 38 may be configured to ignore detected objects located at specified or designated areas. In one embodiment, the designated areas may be designated on the electronic map by the machine operator or other personnel. In another embodiment, the electronic map may be limited so that the designated areas are outside the electronic map.

In another example, the second haul truck 15 is positioned on haul road 104 and may be designated as a unknown obstacle based upon the data within the electronic map. However, an operator would likely expect machines 10 to be traveling along the haul road and may require less warning about such machines unless they are very close to the operator. As a result, the object identification system 38 may be configured to designate as known obstacles detected objects located at a designated area such as a specified area or along a specified path (e.g., the haul road) as long as they remain in the area or on the path.

Other manners of reducing the number of warnings or alert signals for objects that are not of significant concern are contemplated.

In addition to different warning zones depending upon whether a detected object is a known or an unknown obstacle, the alert signals generated by the alert system 40 may also be different depending upon whether the detected object is a known obstacle or an unknown obstacle. In one example, different sounds or tones may be used as an alert signal depending upon whether the detected object is a known or unknown obstacle. In another example, different movements of components to be engaged by an operator (e.g., an operator input device 27 such as a joystick or an operator seat 26) may be used as an alert signal depending upon whether the detected object is a known or unknown obstacle. The movements could be different types of vibrations such as vibrations in different directions or movement of one component for one type of alert signal and movement of a different component for a different type of alert signal.

Once the object detection system 35 has detected an object, the object identification system 38 may operate to differentiate between known and unknown obstacles at the work site 100. For example, upon the object detection system 35 detecting an object within range of the object detection sensors 36, the controller 31 may determine the position of the object. The object identification system 38 may then compare the location of the detected object to obstacles, both known and unknown, stored within an electronic map within or accessed by controller 31. A detected object that corresponds to either a known or an unknown object within the electronic map is maintained with such a designation. Objects that correspond to neither known nor unknown objects within the electronic map may be designated as new unknown objects.

In some instances, the operator station 25 may be positioned to minimize blind spots of machine 10 (i.e., maximize the unobstructed area viewable by an operator of the haul truck). However, because of the size and configuration of some machines 10, the blind spots may be relatively large. Further, regardless of the configuration of the machine, obstacles or objects may sometimes be located within a blind spot and thus not directly visible to an operator.

To increase the operator's field of view of the area surrounding the machine, machine 10 may include an image display system 41, shown generally by an arrow in FIG. 2 to indicate association with the machine. The image display system 41 may combine the object detection system 35 and the object identification system 38 described above together with a visual image system 42 mounted on or associated with the machine, as shown generally by an arrow in FIG. 4 indicating association with the machine 10. The image display system 41 may be used to generate camera images or views of the environment around machine 10, which may then be displayed on display screen 29 within operator station 25.

The visual image system 42 may include a plurality of visual image sensors such as cameras 43 for generating image data from a plurality of points of view relative to the machine 10. Each camera 43 may be mounted on the machine 10 at a relatively high vantage point such as at the top of the frame of the machine or the roof. As depicted schematically in FIG. 4, four cameras 43 are provided that record or sense images in the forward and rearward directions as well as to each side of machine 10. In the embodiment depicted in FIG. 2, the cameras 43 may be positioned in other locations but may face in the same directions as depicted in FIG. 4. Controller 31 may receive image data from the cameras 43 and generate video or still images based upon such images.

Figure 5:
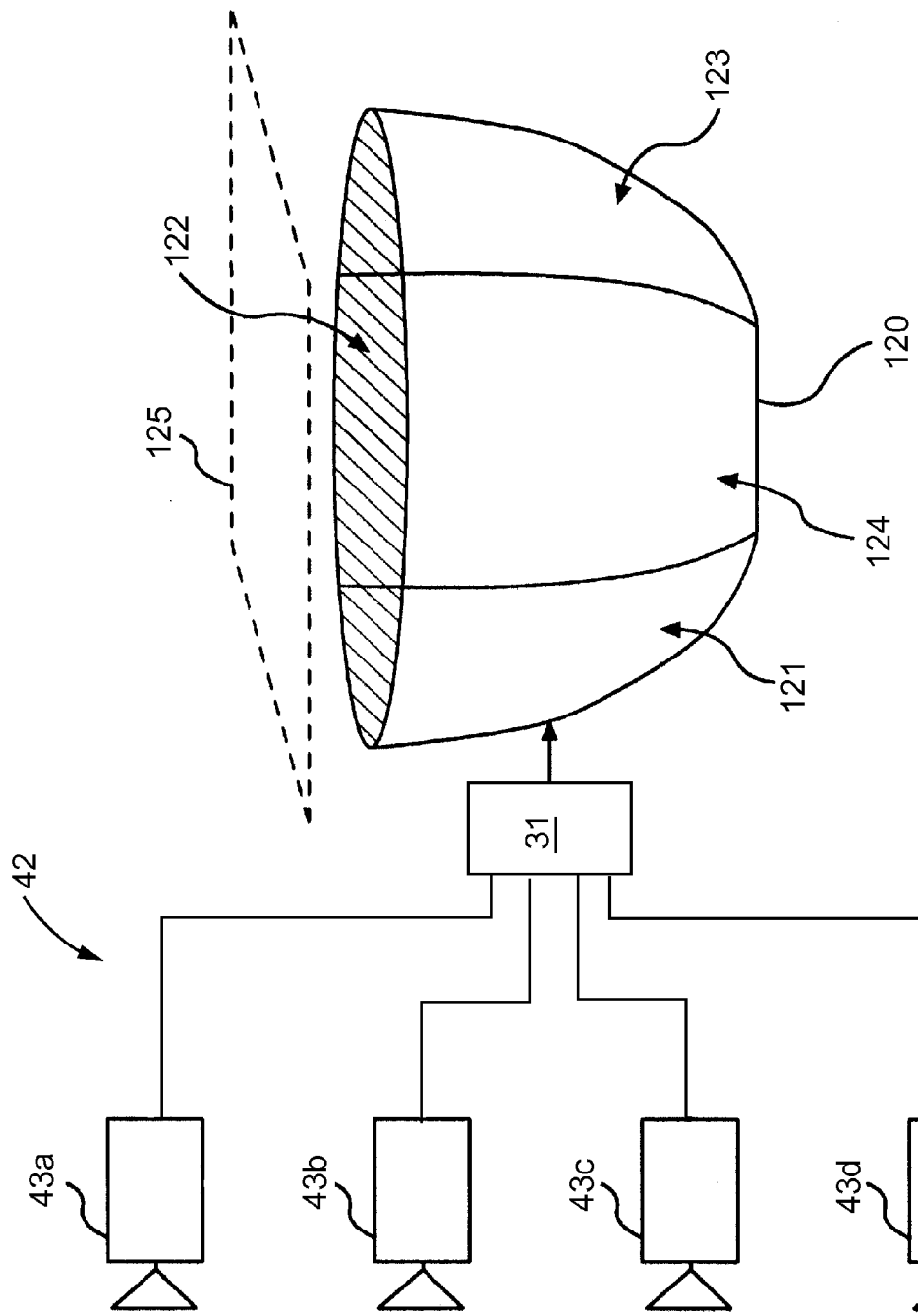
FIG. 5 is a schematic view of a visual image system generating an unified image in accordance with the disclosure.

In some embodiments, controller 31 may combine the image data captured by the cameras 43 into a unified image 120 of a portion of the work site 100 adjacent and surrounding the machine 10 depicted. FIG. 5 is a pictorial illustration of one example of controller 31 combining image data from each of the cameras 43 to generate the unified image 120. The unified image 120 may represent all image data available for the environment of machine 10. In one example, the unified image 120 represents a 360-degree view or model of the environment of machine 10, with machine 10 at the center of the 360-degree view. According to some embodiments, the unified image 120 may be a non-rectangular shape. For example, the unified image 120 may be hemispherical and machine 10 may be conceptually located at the pole, and in the interior, of the hemisphere.

Controller 31 may generate the unified image 120 by mapping pixels of the image data captured by the cameras 43 to a pixel map. The pixel map may be divided into sections, with each section corresponding to one set of image data. For example, as shown in FIG. 4, front or first camera 43a captures image data that is mapped to section 121, right or second camera 43b captures image data that is mapped to section 122, rear or third camera 43c captures image data that is mapped to section 123, and left or fourth camera 43d captures image data that is mapped to section 124. Pixels may be mapped directly using a one-to-one or one-to-many correspondence, and the mapping may correlate a two dimensional point from the image data to a three dimensional point on the map used to generate the unified image 120. For example, a pixel of the image data located at (1, 1) may be mapped to location (500, 500, 1) of the unified image. The mapping may be accomplished using a look-up table that may be stored within controller 31. The look-up table may be configured based on the position and orientation of each camera 43 on machine 10. Although a look-up table is one method by which controller 31 may map the image data to the unified image 120, those skilled in the art will appreciate that other methods for mapping image data may be used to achieve the same effect.

Controller 31 may also use parameters associated with cameras 43 to map pixels from the image data to the unified image 120. The parameters may be included in metadata of the image data. For example, the parameters may include the position of each camera 43 with respect to machine 10. Controller 31 may correlate sections 121-124 of the unified image 120 with machine 10, and controller 31 may use the correlations to determine which of the image data to map to each section. For example, controller 31 may correlate section 121 with the front of machine 10. When the controller receives image data from front or first camera 43a, the parameters included in the metadata associated with such image data may indicate that it was captured by first camera 43a. The parameters may also indicate that first camera 43a is positioned on the front of machine 10. Controller 31 may analyze the parameters and determine that certain image data should be mapped to section 121. Thus, as controller 31 accesses the image data, it can correctly map it to sections 121-124 of the unified image 120. Other manners of generating a unified image are contemplated.

Image display system 41 may be configured to select a portion of the unified image 120 and transmit such image for rendering on display screen 29 within operator station 25. To do so, controller 31 may select the portion using a designated viewpoint. The viewpoint 125 depicted in FIG. 5 represents a plane from which the unified image 120 may be viewed, and the pixels located under the plane form the portion of the unified image 120 that is rendered on display screen 29. For example, as shown in FIG. 5, viewpoint 125 is positioned above the entire unified image 120, and all of the pixels of the unified image are located under viewpoint 125. With this designated viewpoint, the unified image is configured as a birds-eye or overhead view with the machine 10 centered therein and such image may be rendered on display screen 29.

Other viewpoints may be used to generate an image to be displayed. For example, the viewpoint 125 may be shifted laterally relative to the unified image 120 to provide a larger field of view of one portion or side of the operating environment around the machine 10. In such case, the controller 31 may render a shifted bird's eye view, which is based upon the bird's eye view but with the machine 10 shifted relative to the unified image 120. This may be desirable to emphasize the existence or details of objects detected on one or two sides of machine 10.

In another example, controller 31 may generate images from a single point of view or direction such as by displaying an image indicative of image data from only one camera 43. Such viewpoint may be referred to as a directional view as it may correspond to a direction relative to the machine 10. In some circumstances, a directional view may be generated by data from a combination of two or more cameras 43. In some instances, a directional view may correspond to a state of the machine (e.g., correspond to a direction that the machine is moving or a state of the transmission such as neutral, drive, or reverse).

Image display system 41 may be further configured to add additional details to a rendered image such as by using an overlay to increase the efficiency and safety of the operation of the machine 10. For example, the image display system may highlight or otherwise identify to an operator objects that have been detected by the object detection system 35. In doing so, the type of object detected (known obstacle or unknown obstacle) and the distance to the object may be highlighted or otherwise identified. In one example, different color overlays may be used depending on whether the object is known or unknown. For example, the overlays for known objects may be a first color (e.g., blue) and the overlays for unknown objects may be a second color (e.g. red). If desired, other aspects of the overlay may change depending on the distance to a detected object. For example, aspects of the overlay may change such as by flashing or changing the intensity of the color to provide an additional visual warning to an operator.

Figure 6:
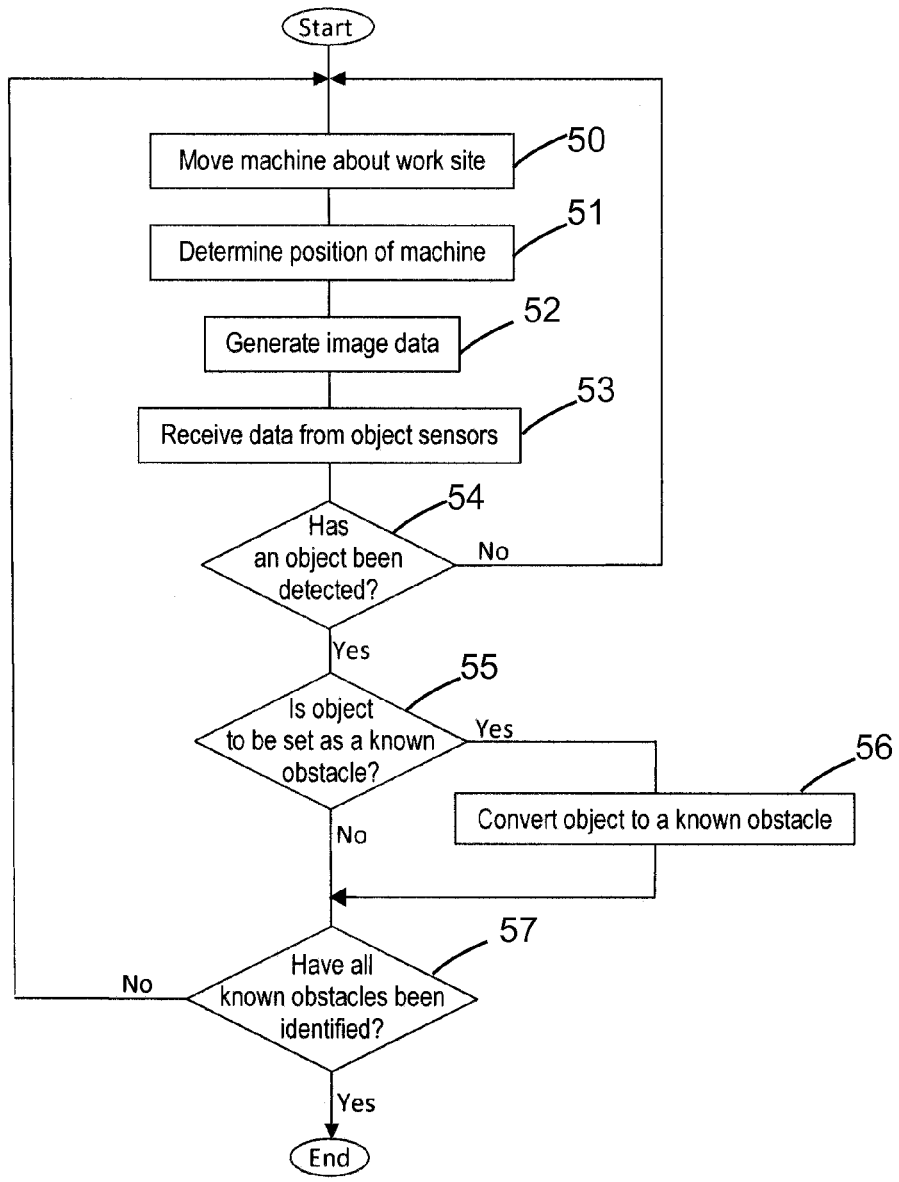
FIG. 6 is a flowchart of a process for generating an electronic map of obstacles at a work site.

The object detection system 35 may be preloaded with an electronic map of all or a portion of the work site 100 including the locations of a plurality of known obstacles. In the alternative, an electronic map may be generated as set forth in the flowchart depicted in FIG. 6. At stage 50, the object detection system 35 may be positioned at and moved about the work site 100 such as by moving machine 10. At stage 51, the controller 31 may receive position signals from the position sensors 34 and the controller 31 may determine at stage 52 the position of the machine 10 based upon the position signals from the position sensors. The controller 31 may receive at stage 53 data from the object detection sensors 36. At decision stage 54, the controller may determine whether the object detection system 35 has detected any objects. If no objects have been detected, the object detection system 35 may be moved and stages 53 and 54 repeated.

If an object has been detected, a machine operator or other personnel may determine at decision stage 55 whether the object is to be set as a known obstacle. If the detected object is to be set as a known obstacle, the detected object may be converted and stored at stage 56 within the electronic map as a known obstacle. As described, the controller 31 may be configured so that each detected object defaults to an unknown obstacle unless the machine operator or other personnel designate or convert the detected object from an unknown obstacle designation to a known obstacle designation. In an alternate embodiment, the controller 31 may be configured so that each detected obstacle must be designated as either a known obstacle or an unknown obstacle.

At decision stage 57, a machine operator or other personnel may determine whether all of the known obstacles have been identified and stored within the electronic map. If all of the known obstacles have not been identified, stages 50-57 may be repeated until all of the known obstacles have been identified.

Figure 7:
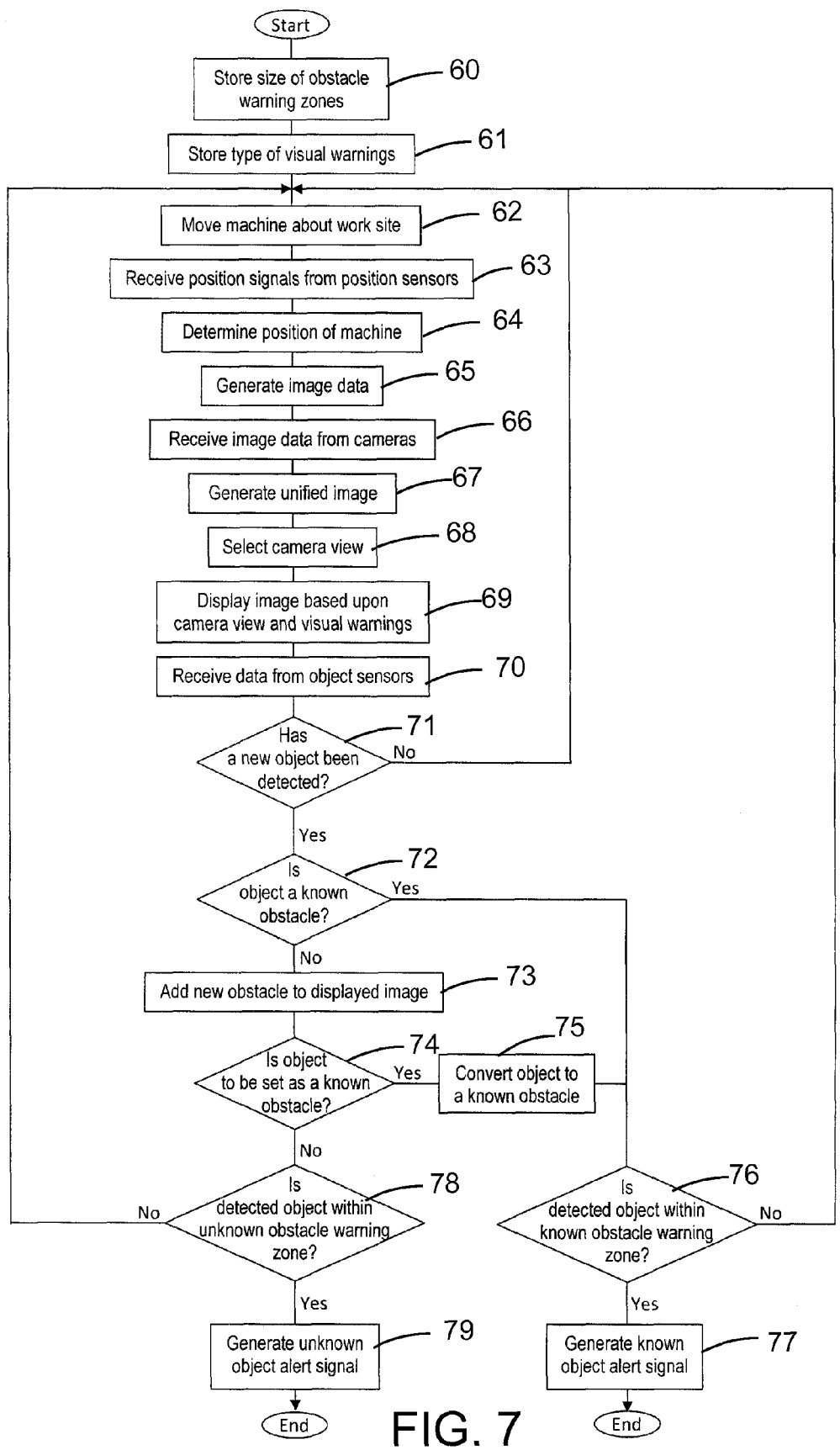
FIG. 7 is flowchart of a process of detecting obstacles, displaying images on a display screen, and generating alarm signals with respect to the obstacles.

Referring to FIG. 7, a flowchart of the operation of the object detection system 35 is depicted. At stage 60, the size of the known obstacle warning zone and the unknown obstacle warning zone may be entered or stored within controller 31. In one embodiment, the size of the warning zones may be entered by a machine operator or any other personnel. In another embodiment, the size of the warning zones may be preset within the controller 31. At stage 61, the type of visual warnings may be entered or stored within controller 31. In one embodiment, the visual warning may include a blue overlay around known obstacles and a red overlay around unknown obstacles. In another embodiment, the visual warning may include a red overlay around unknown obstacles and no additional coloring or overlay around known obstacles. In each instance, any desired colors may be used.

At stage 62, the machine 10 may be positioned at and moved about the work site 100. The controller 31 may receive at stage 63 position signals from the position sensors 34 and determine at stage 64 the position of the machine 10 based upon the position signals from the position sensors.

Cameras 43 may generate image data at stage 65 and controller 31 may receive at stage 66 the image data from the cameras. Inasmuch as the cameras 43 face in a multiple directions, image data may be generated depicting the operating environment surrounding the machine 10. The image data may include images captured by cameras 43, as well as metadata including parameters associated with each of cameras 43. The parameters may describe the orientation of each camera 43, the position of each camera with respect to machine 10, and the range of each camera's field of view.

At stage 67, controller 31 may use the image data to generate a unified image 120 of the operating environment of machine 10 by combining the image data generated by the cameras 43 as described in more detail above. Once controller 31 has generated the unified image 120, the controller may select at stage 68 a camera view to be rendered based upon a portion of the unified image 120 or a directional view from one or more of the cameras 43. The controller 31 may select the camera view to be rendered based upon a plurality of factors including the state of the operation of the machine 10, the number of and proximity to any objects detected adjacent the machine, and the identity of any objects detected, as well as any other desired factors.

At stage 69, the controller 31 may display an image on display screen 29 based upon the camera view selected at stage 63 together with any visual warnings based upon the types of objects displayed on the display screen. More specifically, the image displayed on the display screen 29 may include the camera view together with desired colored overlays based upon whether objects in the image are known or unknown obstacles.

At stage 70, the controller 31 may receive data from the object detection sensors 36. At decision stage 71, the controller may determine whether the object detection system 35 has detected any objects. If no objects have been detected, stages 62-71 may be repeated. If an object has been detected, controller 31 may determine at decision stage 72 whether the detected object is a known obstacle stored within the electronic map of the controller.

If the detected object is an unknown obstacle, the controller 31 may be configured to add at stage 73 an image of the unknown obstacle together with the unknown obstacle visual warning to the image being displayed on display screen 29. In addition, a machine operator or other personnel may determine at decision stage 74 whether the object is to be set or designated as a known obstacle. If the detected object is to be set as a known obstacle, the detected object may be converted and stored at stage 75 within the electronic map as a known obstacle.

The controller 31 may determine at decision stage 76, whether the machine 10 is within the known obstacle warning zone. More specifically, if the detected object is determined to be a known obstacle at decision stage 72 or converted to be a known obstacle at stage 75, the controller 31 may determine at decision stage 76 whether the machine 10 is closer to the detected object than the size of the known obstacle warning zone. In other words, the controller 31 may determine whether the machine 10 is within the known obstacle warning zone surrounding the detected object.

If the machine 10 is closer to the detected object than the known obstacle warning zone, the controller 31 may generate a known obstacle or first alert signal at stage 77. The first alert signal may take any form and may include an audible warning, a visual warning such as generating a flashing indicator of the image of the known obstacle or its overlay or changing the color of the image or overlay, and/or the movement of components configured to be engaged by an operator of the machine 10 such as by vibrating an input devices 27 (e.g., a joystick) or an operator seat 26.

If the detected object is not within the known obstacle warning zone at decision stage 76, the processes of steps 62-76 may be repeated.

If the detected object is to be maintained as an unknown obstacle at decision stage 74, the controller 31 may determine at decision stage 78, whether the machine 10 is within the unknown obstacle warning zone. More specifically, if the detected object is determined to be an unknown obstacle at decision stage 72 and is not converted to be a known obstacle at stage 75, the controller 31 may determine at decision stage 78 whether the machine 10 is closer to the detected object than the size of the unknown obstacle warning zone. In other words, the controller 31 may determine whether the machine 10 is within the unknown obstacle warning zone surrounding the detected object.

If the machine 10 is closer to the detected object than the unknown obstacle warning zone, the controller 31 may generate an unknown obstacle or second alert signal at stage 79. The second alert signal may take any form such as those described above with respect to the first alert signal. In some instances, the first alert signal and the second alert signal may an identical form but different outputs (e.g., different audible warnings, different movements of components, or different visual warnings). In other instances, the first alert signal and the second alert signal may have an identical form and output. In still other instances, the first alert signal and the second alert signal may have different forms and different outputs (e.g., the first alert signal may be an audible warning and the second alert signal may be a visual warning).

If the detected object is not within the unknown obstacle warning zone at decision stage 78, the processes of steps 62-74 and 78-79 may be repeated.

INDUSTRIAL APPLICABILITY

The industrial applicability of the system described herein will be readily appreciated from the foregoing discussion. The foregoing discussion is applicable to machines 10 that are operated at a work site 100 at which known and unknown obstacles may be present. The object detection system 35 may be used at a mining site, a landfill, a quarry, a construction site, a roadwork site, a forest, a farm, or any other area in which it is desired to improve the efficiency of a machine operation.

Known obstacles may be stored within an electronic map of the work site 100. An object detection system 35 is operative to detect objects in proximity to the machine 10. If the detected objects are known obstacles, the object detection system 35 may use a known obstacle warning zone. For detected objects that are unknown obstacles, the object detection system 35 may use an unknown object warning zone. The known object warning zone and the unknown object warning zone may be of different size to reduce the number of warnings and alert signals generated for obstacles about which an operator is aware. New objects that are detected may be added to the electronic map as known obstacles to reduce future warnings and alert signals.

An image display system 41 may be included to display a visual image of an area in proximity to the machine 10. The image display system 41 may display camera views generated by the visual image system 42 together with an unknown obstacle warning such as a colored overlay for all or some of the unknown obstacles. If desired, the image display system 41 may also include known obstacle warnings for all or some of the known obstacles. The known obstacle warnings may be an overlay that is a different color from the unknown obstacle warning.

The object detection system 35, the object identification system 38, and the image display system 41 may operate to provide an operator with additional information regarding known and unknown obstacles. This additional information is desirable to reduce collisions with obstacles due to warnings and alert signals being ignored as a result of an operator receiving too much information.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. An obstacle detection system for use at a work site, comprising:
   an object detection system associated with a machine for detecting objects in proximity to the machine;
   an alert system for generating an alert signal; and a controller configured to:
   store an electronic map containing a known obstacle;
   store a known obstacle warning zone and an unknown obstacle warning zone;
   detect a detected object in proximity to the machine;
   compare the detected object to the known obstacle to determine whether the detected object is the known obstacle or an unknown obstacle;
   generate a first alert signal if the detected object is the known obstacle and within the known obstacle warning zone; and
   generate a second alert signal if the detected object is the unknown obstacle and within the unknown obstacle warning zone.

2. The obstacle detection system of claim 1, further including a visual image system mounted on the machine for generating image data relative to the machine and a display screen, and
   the controller is configured to:
   store an unknown obstacle warning;
   receive the image data from the visual image system;
   generate a camera image based upon the image data;
   determine an image to be rendered on the display screen based upon the camera image if the detected object is the known obstacle;
   determine an image to be rendered on the display screen based upon the camera image and the unknown obstacle warning if the detected object is the unknown obstacle; and
   render the image on the display screen.

3. The obstacle detection system of claim 2, wherein the visual image system generates image data from a plurality of points of view relative to the machine and the camera image is generated by combining the image data from the plurality of points of view.

4. The obstacle detection system of claim 2, wherein the controller is further configured to store a known obstacle warning and the image to be rendered if the detected object is a known obstacle is based upon the camera image and the known obstacle warning.

5. The obstacle detection system of claim 4, wherein the known obstacle warning and the unknown obstacle warning are different colored overlays.

6. The obstacle detection system of claim 1, wherein the first alert signal and the second alert signal are different audible warnings.

7. The obstacle detection system of claim 6, wherein the first alert signal and the second alert signal are different movements of components configured to be engaged by an operator.

8. The obstacle detection system of claim 1, wherein the second alert signal includes a flashing indicator.

9. The obstacle detection system of claim 1, wherein the controller is configured to store a plurality of known obstacles in the electronic map, and compare the detected object to the plurality of known obstacles.

10. The obstacle detection system of claim 1, wherein the controller is configured to store as the unknown obstacle in the electronic map a newly detected object that is not a known obstacle.

11. The obstacle detection system of claim 10, wherein the controller is configured to convert the unknown obstacle stored within the electronic map to the known obstacle based upon a conversion command.

12. The obstacle detection system of claim 11, further including an input device for providing the conversion command.

13. The obstacle detection system of claim 10, wherein the electronic map includes a map of a portion of the work site and further including a position sensing system associated with the machine for generating position signals indicative of a position of the machine relative to the work site, and wherein the controller is further configured to determine the position of the machine relative to the work site based upon the position signals, and determine the position of the machine relative to a plurality of known obstacles.

14. The obstacle detection system of claim 1, wherein the controller is further configured to ignore detected objects located at a designated area.

15. The obstacle detection system of claim 1, wherein the controller is further configured to designate detected objects located at a designated area as known obstacles.

16. The obstacle detection system of claim 1, wherein the known obstacle is a movable known object and the controller is further configured to track the movable known object as it moves about the work site.

17. A controller-implemented method of detecting obstacles at a work site, comprising:
   storing electronic map containing a known obstacle;
   storing a known obstacle warning zone and an unknown obstacle warning zone;
   detecting a detected object in proximity to a machine;
   comparing the detected object to the known obstacle to determine whether the detected object is the known obstacle or an unknown obstacle;
   generating a first alert signal if the detected object is the known obstacle and within the known obstacle warning zone; and
   generating a second alert signal if the detected object is the unknown obstacle and within the unknown obstacle warning zone.

18. The method of claim 17, further including
   storing an unknown obstacle warning;
   receiving image data from a visual image system;
   generating a camera image based upon the image data;
   determining an image to be rendered on a display screen based upon the camera image if the detected object is the known obstacle;
   determining an image to be rendered on the display screen based upon the camera image and the unknown obstacle warning if the detected object is the unknown obstacle; and rendering the image on the display screen.

19. The method of claim 18, further including storing a known obstacle warning and determining an image to be rendered on the display screen based upon the camera image and the known obstacle warning if the detected object is the unknown obstacle.

20. A machine comprising:
   a propulsion system;
   an object detection system associated with the machine for detecting objects in proximity to the machine;
   an alert system for generating an alert signal; and
   a controller configured to:
   store an electronic map containing a known obstacle;
   store a known obstacle warning zone and an unknown obstacle warning zone;
   detect a detected object in proximity to the machine;
   compare the detected object to the known obstacle to determine whether the detected object is the known obstacle or an unknown obstacle;
   generate a first alert signal if the detected object is the known obstacle and within the known obstacle warning zone; and
   generate a second alert signal if the detected object is the unknown obstacle and within the unknown obstacle warning zone.

* * * * *